US010752251B2

(12) United States Patent
Sjödin

(10) Patent No.: US 10,752,251 B2
(45) Date of Patent: Aug. 25, 2020

(54) METHOD AND CONTROL SYSTEM FOR CHARGING A HYBRID VEHICLE

(71) Applicant: Scania CV AB, Södertälje (SE)

(72) Inventor: Robert Sjödin, Nyköping (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/550,396

(22) PCT Filed: Feb. 18, 2016

(86) PCT No.: PCT/SE2016/050126
§ 371 (c)(1),
(2) Date: Aug. 11, 2017

(87) PCT Pub. No.: WO2016/133453
PCT Pub. Date: Aug. 25, 2016

(65) Prior Publication Data
US 2018/0029600 A1 Feb. 1, 2018

(30) Foreign Application Priority Data

Feb. 18, 2015 (SE) ...................................... 1550178

(51) Int. Cl.
*B60W 30/192* (2012.01)
*B60W 10/06* (2006.01)
(Continued)

(52) U.S. Cl.
CPC ........... *B60W 30/192* (2013.01); *B60L 53/16* (2019.02); *B60W 10/06* (2013.01); *B60W 10/08* (2013.01);
(Continued)

(58) Field of Classification Search
CPC .... B60W 30/192; B60W 20/00; B60W 10/06; B60W 10/08; B60W 10/26; B60W 10/10;
(Continued)

(56) References Cited

U.S. PATENT DOCUMENTS 5,614,883 A * 3/1997 Dery ....................... F02N 11/10
180/287
5,934,395 A 8/1999 Koide et al.
(Continued)

FOREIGN PATENT DOCUMENTS

DE 10065726 A1 7/2002
DE 102010009727 A1 7/2002
(Continued)

OTHER PUBLICATIONS

International Search Report for PCT/SE2016/050126 dated May 18, 2016.
(Continued)

*Primary Examiner* — Ramsey Refai
(74) *Attorney, Agent, or Firm* — Moore & Van Allen PLLC; W. Kevin Ransom

(57) ABSTRACT

A hybrid vehicle comprising an internal combustion engine, a hybrid system, a parking brake, a gear box and an electronic control system is provided. A method for controlling the method comprises charging the hybrid vehicle by receiving and storing electric energy, which enables a safe way of starting the internal combustion engine during the charging. An electronic control system is configured to: detect a starting attempt of the internal combustion engine during the receiving and storing of electrical energy; ensure that the hybrid vehicle is ready for a start of the internal combustion engine, which includes ensuring that the gear box is in a neutral gear and that the parking brake is applied; and thereafter start the internal combustion engine during the receiving and storing of electrical energy.

14 Claims, 3 Drawing Sheets

(51) Int. Cl.
| | |
|---|---|
| *B60W 10/08* | (2006.01) |
| *B60W 10/10* | (2012.01) |
| *B60L 53/16* | (2019.01) |
| *B60W 30/18* | (2012.01) |
| *B60W 10/18* | (2012.01) |
| *B60W 10/26* | (2006.01) |
| *B60W 20/00* | (2016.01) |

(52) U.S. Cl.
CPC .......... *B60W 10/10* (2013.01); *B60W 10/182* (2013.01); *B60W 10/26* (2013.01); *B60W 20/00* (2013.01); *B60W 30/18054* (2013.01); *B60L 2240/30* (2013.01); *B60L 2240/42* (2013.01); *B60L 2240/44* (2013.01); *B60L 2240/48* (2013.01); *B60L 2240/54* (2013.01); *B60W 2510/101* (2013.01); *B60W 2510/186* (2013.01); *B60W 2710/1005* (2013.01); *B60W 2710/186* (2013.01); *B60Y 2200/92* (2013.01); *Y02T 10/6269* (2013.01); *Y10S 903/93* (2013.01)

(58) Field of Classification Search
CPC ......... B60W 10/182; B60W 2510/101; B60W 2510/186; B60W 2710/1005; B60W 2710/186; B60L 11/1818; B60L 2240/54; B60L 2240/44; B60L 2240/42; B60L 2240/48; B60L 2240/30; Y10S 903/93; B60Y 2200/92
See application file for complete search history.

(56) References Cited

U.S. PATENT DOCUMENTS

| | | | | |
|---|---|---|---|---|
| 6,384,490 | B1* | 5/2002 | Birzl | F02N 11/10 307/10.1 |
| 7,133,758 | B2* | 11/2006 | Otto | B60K 28/04 701/50 |
| 7,532,959 | B2* | 5/2009 | Ochs | B60R 25/045 123/179.2 |
| 7,717,076 | B2* | 5/2010 | Gandert | B60W 10/06 123/179.3 |
| 8,028,780 | B2 | 10/2011 | Sagawa et al. | |
| 8,299,748 | B2 | 10/2012 | Soma et al. | |
| 8,538,638 | B2* | 9/2013 | Vujasinovic | B60K 28/10 701/49 |
| 8,583,309 | B2 | 11/2013 | Kaita et al. | |
| 8,788,131 | B2 | 7/2014 | Nabeshima et al. | |
| 8,863,870 | B2* | 10/2014 | Gwozdek | B60T 17/18 180/65.31 |
| 8,924,057 | B2* | 12/2014 | Kinser | B60K 6/46 701/22 |
| 8,942,873 | B2 | 1/2015 | Kim et al. | |
| 9,010,469 | B2 | 4/2015 | Saito | |
| 9,969,354 | B2* | 5/2018 | Kojima | B60L 53/60 |
| 2007/0129862 | A1 | 6/2007 | Kim et al. | |
| 2008/0125265 | A1 | 5/2008 | Conlon et al. | |
| 2008/0275600 | A1* | 11/2008 | Rask | B60K 6/24 701/22 |
| 2009/0250277 | A1 | 10/2009 | Grand et al. | |
| 2010/0063675 | A1* | 3/2010 | Soma | B60L 15/007 701/36 |
| 2010/0320018 | A1 | 12/2010 | Gwozdek et al. | |
| 2010/0320964 | A1* | 12/2010 | Lathrop | B60K 6/365 320/109 |
| 2011/0178663 | A1 | 7/2011 | Crombez | |
| 2011/0231034 | A1* | 9/2011 | Kinser | B60K 6/46 701/2 |
| 2012/0061163 | A1 | 3/2012 | Musser | |
| 2014/0165676 | A1* | 6/2014 | Inoue | E05B 81/18 70/256 |
| 2014/0236402 | A1* | 8/2014 | Nomura | B60K 6/48 701/22 |
| 2014/0306816 | A1 | 10/2014 | Nakamura | |
| 2015/0057859 | A1* | 2/2015 | Yamamoto | B60T 7/12 701/22 |
| 2016/0059806 | A1* | 3/2016 | Thommes | B60L 1/00 701/29.1 |
| 2016/0207409 | A1 | 7/2016 | Ueo | |
| 2016/0272074 | A1* | 9/2016 | McGrath | B60L 53/55 |
| 2017/0126033 | A1 | 5/2017 | Dudar | |
| 2018/0029488 | A1* | 2/2018 | Sjodin | H02M 1/12 |

FOREIGN PATENT DOCUMENTS

| | | |
|---|---|---|
| DE | 102013006254 A1 | 10/2014 |
| EP | 0769403 A2 | 4/1997 |
| EP | 2108528 A1 | 10/2009 |
| EP | 2108538 A1 | 10/2009 |
| EP | 2423027 A2 | 10/2009 |
| EP | 2500223 A1 | 9/2012 |
| EP | 2584227 A1 | 4/2013 |
| EP | 2778002 A1 | 9/2014 |
| EP | 2821277 A1 | 1/2015 |
| FR | 2967122 A1 | 1/2015 |
| GB | 2501727 A | 11/2013 |
| JP | H06343205 A | 12/1994 |
| JP | 2009227218 A | 10/2009 |
| KR | 20070080420 A | 8/2007 |
| KR | 20110130453 A | 12/2011 |
| KR | 20140042218 A | 4/2014 |
| WO | 2011107197 A2 | 9/2011 |
| WO | 2014078456 A1 | 5/2014 |
| WO | 2015004874 A1 | 1/2015 |

OTHER PUBLICATIONS

Written Opinion of the International Searching Authority for PCT/SE2016/050126 dated May 18, 2016.
Scania CV AB, Korean Patent Application No. 10-2017-7024906, Office Action, dated Jan. 11, 2019.
Dmv.Ri.Gov: "2005 Commercial Driver's License Manual Section 5—Air Brakes p. 1 Section 5 Air Brakes This Section Covers @Bullet Air Brake System Parts @Bullet Dual Air Brake Systems @Bullet Inspecting Air Brakes @Bullet Using Air Brakes", Dec. 30, 2005 (Dec. 30, 2005), XP055515568, Retrieved from the Internet: URL: http://www.dmv.ri.gov/documents/manual s/Section5_Air_Brakes.pdf [retrieved on Oct. 16, 2018].
International Preliminary Report on Patentability for International Patent Application No. PCT/SE2016/050126 dated Aug. 22, 2017.
European Search Report for International Patent Application No. PCT/SE2016/050126 dated Aug. 8, 2018.
Supplementary European Search Report for International Patent Application No. PCT/SE2016/050126 dated Sep. 5, 2018.

* cited by examiner

METHOD AND CONTROL SYSTEM FOR CHARGING A HYBRID VEHICLE

CROSS-REFERENCE TO RELATED APPLICATION(S)

This application is a national stage application (filed under 35 § U.S.C. 371) of PCT/SE16/050126, filed Feb. 18, 2016 of the same title, which, in turn claims priority to Swedish Application No. 1550178-6, filed Feb. 18, 2015 of the same title; the contents of each of which are hereby incorporated by reference.

FIELD OF THE INVENTION

The invention relates to a hybrid vehicle and a method for controlling charging of a hybrid vehicle.

BACKGROUND OF THE INVENTION

In a normal situation when a plug-in hybrid vehicle should be charged, the driver parks the hybrid vehicle at a charging station, turns off the engine and connects the charging cable to the hybrid vehicle by inserting the plug of the charging cable into the charging socket of the hybrid vehicle. The hybrid system and the charging station starts to communicate and the hybrid system requests charging whereby the charging station starts to deliver electrical energy to the drive assembly battery of the hybrid vehicle.

It is important that the vehicle remains stationary and does not roll or drive away. This is especially important when a charging cable is connected to the vehicle. The driver would normally apply the parking brake when parking the hybrid vehicle.

US 2010/0320018 describes a method for preventing drive away or roll away of a plug-in hybrid vehicle during charging. Driveway and roll away is prevented by disabling the hybrid vehicle by means of a mechanical restraint that locks the parking brake, or locks the gear in a park position. The mechanical restraint is applied by the vehicle when a charging process is detected. The driver is informed audibly or visibly by the disabled hybrid vehicle why the vehicle cannot be driven, see FIGS. 6 and § 0007-§ 0010 in US 2010/0320018. FIG. 7 of US 2010/0320018 shows an embodiment wherein charging is only allowed when the vehicle has been parked.

US 2011/0178663 describes a method for preventing drive away of a hybrid vehicle during charging. The vehicle is disabled when a charging cable is attached to the vehicle. If the driver makes a starting attempt, a message is shown. The vehicle is enabled when the charging cable is removed, see FIGS. 2 and § 0023-§ 0025 in US 2011/0178663.

In addition to the drive assembly battery storage of the hybrid system, such as a high voltage storage, the hybrid vehicle would normally be provided with an accessory battery, such as a low voltage battery storage, for powering accessories, such as lights, heat, air-conditioning and user interface. The accessory battery can be charged by an external charger or by means of a generator driven by the internal combustion engine.

In addition to charging the drive assembly battery storage, the driver may need additional energy when charging the drive assembly battery storage, for example for using the accessories of the hybrid vehicle, or charging the accessory battery.

A problem is that the charging station may have a limited number of charging cables, and may be able to provide only a limited amount of electrical power for charging purposes. Thus, the driver would want to use all available power for the time-consuming charging of the drive assembly battery storage, but would also like to be able to use accessories without risking running out of power in the accessory battery. Thus, there is a need for a hybrid vehicle that may be charged with electrical power and at the same time have power to accessories of the vehicle.

SUMMARY OF THE INVENTION

It is an object of the invention to provide a secure and reliable way of ensuring that the hybrid vehicle remains stationary during charging of the hybrid vehicle, while providing power for use during the charging process.

According to a first aspect, the invention provides a hybrid vehicle comprising an internal combustion engine and hybrid system comprising a charging unit, a battery storage and at least one electric motor. The hybrid vehicle further comprises a parking brake, a gear box and an electronic control system configured to control the internal combustion engine, the hybrid system, the parking brake and the gear box. The hybrid vehicle is configured to receive and store electrical energy during a charging process wherein the charging unit receives electrical energy from an external charging station and the battery storage stores the electrical energy for subsequent use by the at least one electric motor. The charging process is controlled by the electronic control system, and the electronic control system is configured to:

detect a starting attempt of the internal combustion engine during the process of receiving and storing electrical energy;

ensure that the hybrid vehicle is ready for a start of the internal combustion engine, which includes ensuring that the gear box is in a neutral gear, and ensuring that the parking brake is applied; and start the internal combustion engine during the process of receiving and storing electrical energy and after ensuring that the gear box is in the neutral gear, and that the parking brake is applied.

Thus, the hybrid vehicle allows starting of the internal combustion engine during the charging process when the hybrid vehicle receives and stores electric energy, while ensuring that the hybrid vehicle remains stationary by means of the applied parking brake and by means of the gear box being set in the neutral gear. Thus, additional energy can be provided by the internal combustion engine during the charging process. Also, having the gear box in the neutral gear prevents that the internal combustion engine drives the wheels, which is especially important during a charging process when a charging cable is connected between the hybrid vehicle and the external charging station.

In an embodiment, the electronic control system is configured to lock the gear box in the neutral gear in order to ensure that the gear box is in the neutral gear before the starting of the internal combustion engine.

By locking the gear box in neutral it is assured that the internal combustion engine will not drive the wheels by an intentional or accidental maneuvering of the gear box.

In an embodiment, the electronic control system is configured to lock the gear box in the neutral gear before starting the process of receiving and storing electrical energy. Locking the gear box in neutral already before starting the charging process provides a safe charging process by preventing drive away of the vehicle, regardless of whether the driver subsequently would like to start the internal combustion engine or not.

The electronic control system may also ensure that the parking brake is applied before starting the process of receiving and storing electrical energy, in order to make sure roll away of the vehicle is prevented during the charging process even during charging processes where the internal combustion engine is not subsequently started.

In an embodiment, the electronic control system is configured to lock the gear box electronically, e.g. by means of setting an inhibit signal in the electronic control system. Thus, preferably, the hybrid vehicle comprises an electronically actuatable parking brake and the hybrid vehicle is configured to lock the parking brake, e.g. by means of setting an inhibit signal in the electronic control system.

In an embodiment, the electronic control system is configured to lock the parking brake in its applied state in order to ensure that the parking brake is applied before the starting of the internal combustion engine, and preferably also before starting the charging process. Releasing of the parking brake is thereby prevented, and roll away of the hybrid vehicle, with a charging cable connected between the hybrid vehicle and the charging station, is avoided.

In an embodiment, the electronic control system is configured to lock the parking brake electronically, e.g. by means of setting an inhibit signal in the electronic control system.

Preferably, the hybrid vehicle is adapted to provide inhibiting signals that locks the gear box and the parking brake during a charging process of the hybrid vehicle, while providing an enabling mode that allows running of the internal combustion engine. The enabling mode is provided on the basis that the hybrid vehicle is being charged, including receiving and storing electric energy, and that both gear box and the parking brake is locked. The hybrid vehicle is configured to perform a charging process that comprises an enabling mode that is active when the gear box is set in neutral and the parking brake is activated, otherwise the enabling mode of the charging process is inactivated.

In an embodiment, the electronic control system is configured check that the internal combustion engine is off before starting the process of receiving and storing electrical energy. Ensuring that the internal combustion engine is off contributes to a safe start of the charging process.

According to a second aspect, the invention provides a method for controlling charging of a hybrid vehicle, which comprises an electronic control system, a hybrid system, a parking brake, a gear box and an internal combustion engine. The method is performed by the electronic control system of the hybrid vehicle during charging of the hybrid vehicle and comprises:

- detecting a starting attempt of the internal combustion engine during receiving and storing of electric energy;
- ensuring that start of the internal combustion engine is allowed, including ensuring that the gear box is in the neutral gear and that the parking brake is applied; and
- starting the internal combustion engine during the receiving and storing of electric energy, which starting is performed after ensuring that start of the internal combustion engine is allowed.

The invention provides a method for charging a hybrid vehicle that includes starting the internal combustion engine in order to provide power during the charging of the hybrid vehicle, wherein drive away and roll away is prevented by ensuring that the gear is in neutral and that the parking brake is applied.

Normally, the driver will have performed the steps of parking the vehicle, turning off the engine, and applying the parking brake, where after the driver will have connected the hybrid vehicle to a charging station, including inserting a plug of a charging cable into a charging socket of vehicle.

In an embodiment, the ensuring that the gear box is in neutral includes locking the gear box in neutral.

In an embodiment, the locking of the gear box is performed electronically, e.g. by means of setting an inhibit signal in the electronic control system.

In an embodiment, the locking of the gear box in the neutral gear is performed prior to receiving and storing the electric energy.

In an embodiment, the ensuring that the gear box is in neutral is performed prior to starting the actual charging, i.e. prior to receiving and storing the electric energy.

In an embodiment, the method also includes ensuring that the vehicle is ready charging that includes monitoring the status of the gear box and detecting that the gear box is in the neutral gear. Thereby the engine is not able to drive the wheels even if it is intentionally or unintentionally started during the charging process.

Preferably, the method includes locking the gear box in the neutral gear prior to requesting charging, and thereby prior to receiving and storing the electric energy.

The hybrid vehicle may be equipped with a manually actuated parking brake driven by means of pneumatic pressure system, or alternatively the hybrid vehicle may be equipped with an electronic parking brake that can be actuated by means the electronic control system and driven by means of a pneumatic system.

In an embodiment, the ensuring that the parking brake is applied comprises locking the parking brake.

In an embodiment, the locking of the parking brake being performed electronically, e.g. by setting an inhibit signal in the electronic control system.

In an embodiment, said starting attempt is detected during the reception and storage of electric energy, and the method further comprises checking that the engine is off before receiving and storing the electric energy. The invention will enable start of the internal combustion engine during charging, but as a safety measure do not allow initiating the charging if the internal combustion engine is running.

According to a third aspect, the present invention provides a computer program product comprising a computer program that is loadable into a memory of an electronic control system of a hybrid vehicle, and which computer program upon execution in the electronic control system, for example a hybrid controller of the electronic control system, enables the electronic control system to perform the method of controlling charging of the hybrid vehicle, as described above and as will be further described in the following description of embodiments.

BRIEF DESCRIPTION OF THE DRAWINGS

The invention will be described, by way of example, with reference to the accompanying drawings, in which.

DETAILED DESCRIPTION OF THE INVENTION

The invention will in the following be described with reference to the accompanying drawings, in which certain embodiments of the invention are illustrated. The invention may however be embodied in many different forms and should not be construed as limited to the embodiments; rather, these embodiments are provided by way of example in order to facilitate in making the invention.

Figure 1:
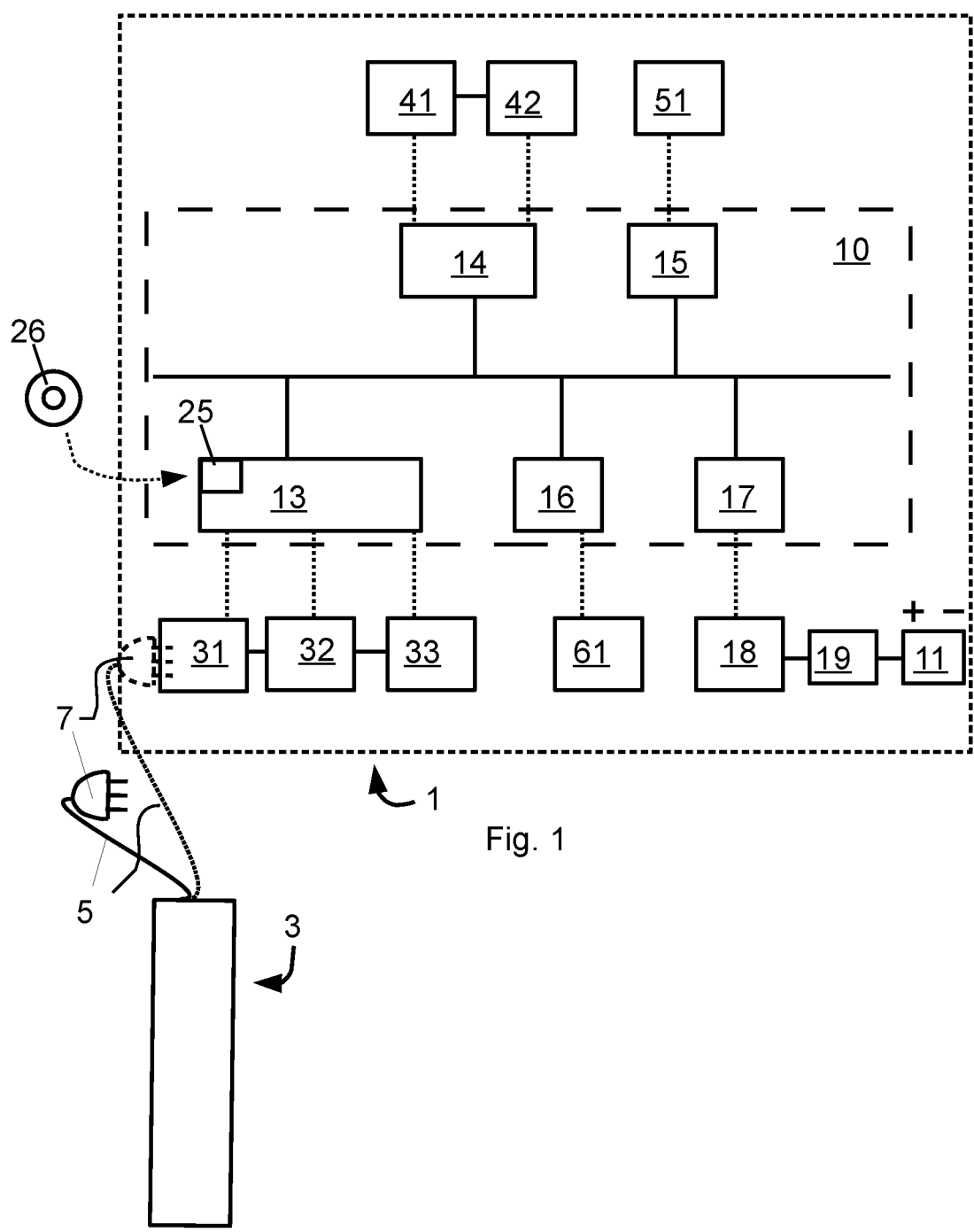
FIG. 1 is a schematic illustration of an embodiment of the hybrid vehicle at a charging station.

FIG. 1 is an overview of parts of an electronic control system 10 of a plug-in hybrid vehicle 1, such as an electronic control system 10 comprising a CAN communication network and comprising a plurality of control units 13-17, such as ECU (Electronic Control Units). The control units are interconnected and includes a hybrid controller 13, a parking brake controller 14, a gear box controller 15, a user interface controller 16 and an engine control system 17.

Each control unit 13-17 is configured to control respective units of the vehicle 1 and in the following features relevant for describing the invention will be described in more detail, although FIG. 1 as such is a simplified illustration of a control system 10 of a hybrid vehicle 1.

The hybrid controller 13 is operatively connected to charging unit 31, a drive assembly battery storage 32 and an electric motor 33. The hybrid controller 13 is configured to monitor and control the charging unit 31 during charging of the hybrid vehicle by means of an external charging station 3, including detecting connection of a charging cable 5 to a cable connector (not illustrated) of the charging unit 31, and requesting charging of the hybrid vehicle from the external charging station 3. The hybrid controller 13 is also configured monitor the charging level of the battery, or electric energy, storage 32.

The parking brake controller 14 is connected to the parking brake system and configured to monitor the status of the parking brake 42. The parking brake 42 is manually activated and pneumatically driven by means of a pneumatic drive system 41. In addition to being activated manually, the parking brake 42 is an electronic parking brake 42 and the hybrid vehicle 1 is configured to electronically maneuver the parking brake by means of the electronic control system 10, especially the parking brake controller 14. The parking brake controller 14 is configured to monitor the state of the parking brake 42 and the pneumatic drive system 41 is arranged to drive the parking brake 42 upon manual or electronic activation. The parking brake controller 14 is configured to control the parking brake 42, especially apply the parking brake 42, when receiving a command from, for example, the hybrid controller 13 that indicates that the parking brake 42 should be applied, such as a command received during a charging process of the hybrid vehicle 1. The electronic control system 10, e.g. the hybrid controller 13, is also configured to prevent release of the parking brake 42 by setting an inhibit signal that locks the parking brake, especially during a charging process.

The gear box controller 15 is operatively connected to the gear box 51 and is configured to monitor the status of the gear box, especially which gear is active. It is suitable to configure the hybrid controller 13 to only allow charging when the gear 51 is in neutral. The gear box controller 15 is configured to select gear, especially applying the neutral, when receiving a command from, for example, the hybrid controller 13 that indicates that the gear box 51 should be switched to neutral. The gear box controller 15 may also be controlled by means of the user interface controller 16, such as by means of gear selectors arranged at the steering wheel (not illustrated) and operatively connected to the user interface controller. The gear box controller 15 is also configured to lock the gear box 51 in a selected gear, especially the neutral gear, when a locking or inhibit signal is set in the electronic control system 10, such as set by the hybrid controller 13 of the electronic control system 10 during a charging process.

The user interface controller 16 is configured to receive user input from the driver, such as the driver turning on and off a main internal combustion engine 18 of the hybrid vehicle 1, such as a diesel, an ethanol or a gas engine, or the driver stopping charging of the hybrid vehicle 1.

The engine control system 17 is configured to monitor the status of the internal combustion engine 18 being on or off, and is operatively configured to start and stop the internal combustion engine 18 upon receiving user input indicating starting and stopping, respectively. The user input may be provided by means of a user interface 61, such as a starting assembly for a key, via the user interface controller 16 to the engine control system 17, which is operatively connected to an internal combustion engine 18 of the hybrid vehicle 1.

The hybrid vehicle 1 also comprises an accessory battery 11 arranged for powering for example the electronic control system 10 and accessories of the vehicle, and a generator 19 arranged for charging the accessory battery 11 by means of the internal combustion engine 18. The generator 19 may also be arranged for directly powering one or more accessories of the vehicle 1.

The hybrid controller 13 is configured to monitor the status of the internal combustion engine 18, especially monitoring whether the internal combustion engine 18 is running or not.

The hybrid controller 13 is adapted for controlling and monitoring the charging unit 31 and monitoring the drive assembly battery storage 32, and especially to control the charging process.

The hybrid controller 13 is also configured to detect the presence of a charging plug 7 inserted into the cable socket (not illustrated) of the charging unit 31, and to communicate with an external charging station 3, including requesting charging from the external charging station 3. The hybrid controller 13 is configured to request charging from the external charging station 3 when the hybrid controller 13 has determined that the hybrid vehicle 1 is ready for charging.

The hybrid vehicle 1, e.g. the hybrid controller 13, is configured to request charging from a charging station 3 when a charging cable has been connected to the charging unit 31, and the hybrid vehicle 1 is ready to be charged. The hybrid vehicle 1, e.g. hybrid controller 13 of the control system 10, is configured to determine that the hybrid vehicle 1 is ready to be charged when:

the gear box 51 is in neutral;
the parking brake 42 is applied; and
the internal combustion engine 71 is turned off.

The hybrid controller 13 is configured to receive electrical energy and store the received electrical energy in the battery storage 32 during the charging process.

The hybrid controller 13 is also configured to monitor the charging process and to establish that the internal combustion engine 18 can be started during the charging process by monitoring the gear box 51 and the parking brake 42. The hybrid controller 13 is configured to enable running of the internal combustion engine 18 during charging by indicating that the internal combustion engine 18 may be started based on the criteria that the gear box 51 is in neutral and the parking brake 42 is applied. The hybrid controller 13 is configured to lock the gear box 51 and the parking brake 42 electronically by means of setting a respective inhibit signal in the electronic control system 10, preferably setting the inhibit signals after ensuring that the hybrid vehicle 1 is ready for charging and prior to requesting charging. The hybrid controller 13 may register an indication that the engine 18 may be started during the charging in a memory of the electronic control system 10, or may be configured to respond to a request for starting the internal combustion engine 18 from the engine control system 17 when it has ensured that the gear box 51 is in neutral and the parking brake 42 is applied. Thus the hybrid controller 13 is configured to provide an enabling mode for start of the internal combustion engine 18 during the charging process Thus, before charging, the hybrid vehicle 1 is configured to ensure that the hybrid vehicle 1 is ready for charging when the internal combustion engine 18 is off, the gear box 51 is in neutral and the parking brake 42 is applied. During charging, the hybrid vehicle 1 is configured to allow start of the internal combustion engine 18 when the gear box 51 is in neutral and the parking brake 42 is applied. The hybrid vehicle 1 is configured to start the internal combustion engine 18 during charging:

upon detecting a user attempt to start the engine 71, such as made by the driver by means of the start button 61 or key; and after ensuring that the gear box 51 is in neutral and the parking brake 42 is applied.

FIG. 1 also illustrates a computer program product 25, illustrated as a computer disc, which computer program product comprises a data carrier having a computer program stored thereon. The data carrier may be any non-transitory entity or device capable of carrying the program. For example, the data carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Alternatively, the carrier may be an integrated circuit in which the program is embedded, the integrated circuit being adapted for performing, or for use in the performance of, the relevant processes. The computer program is adapted for loading into a memory 26 of the electronic control system 10, and the computer program comprises software configured to be executed in the electronic control system 10 of the hybrid vehicle 1. The computer program is adapted to enable the electronic control system 10 to perform its functions, and especially the method steps described with reference to FIGS. 2 and 3 in the following description of embodiments of a method, when executed by the electronic control system 10.

Figure 2:
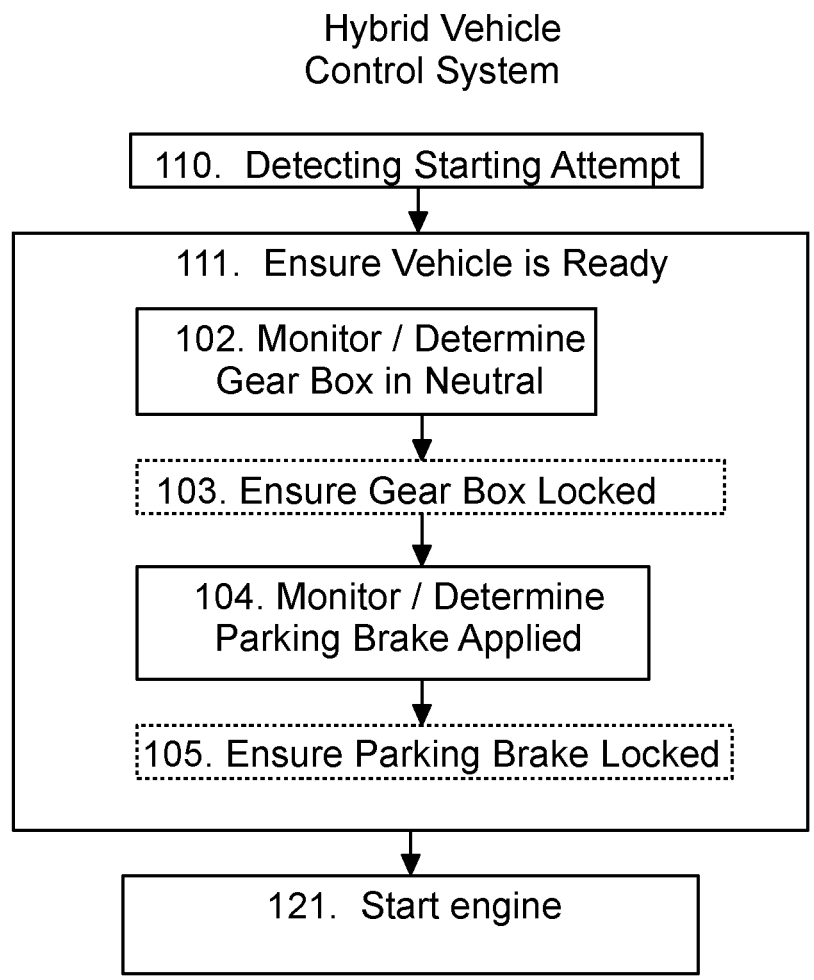
FIG. 2 illustrates a schematic flow chart of controlling starting of the internal combustion engine during charging of the hybrid vehicle.

FIG. 2 illustrates starting of the internal combustion engine 18 during a process of charging the hybrid vehicle 1. The illustrated embodiment of a method of starting the internal combustion engine 18 of a hybrid vehicle 1 is performed during the actual charging, i.e. when receiving and storing electric energy, of the hybrid vehicle 1 and comprises detecting 110 that a starting attempt of the hybrid vehicle 1 is performed, i.e. performed by a user or driver of the hybrid vehicle 1.

After detecting 110 a starting attempt, the method continues with ensuring 111 that the hybrid vehicle 1 is ready for a start of the internal combustion engine 18. The ensuring 111 that the hybrid vehicle is ready for starting the internal combustion engine 18 comprises ensuring 102, 103 that the gear box 51 is in the neutral gear including the steps of monitoring and determining 102 that the gear box 51 is in neutral gear, and ensuring 103 that the gear box 51 is locked, such as locking the gear box 51, or monitoring and determining that the gear box is locked. The locking of the gear box is preferably performed by setting an inhibit signal in the electronic control system 10 of the hybrid vehicle 1, which inhibit signal prevents switching gear by means of the gear box controller 15 holding the gear box 51 locked in neutral.

The ensuring 111 that the hybrid vehicle is ready for starting the internal combustion engine 18 further comprises ensuring 104, 105 that the parking brake is applied, including monitoring and determining 104 that the parking brake is applied. The ensuring 111 ensuring 104, 105 that the parking brake is applied may also include ensuring 105 that the parking brake is locked in the applied state, such as monitoring and determining that the parking brake is locked, or locking the parking brake. Locking the parking brake 42 is performed by setting an inhibit signal in the electronic control system 10 of the hybrid vehicle 1, which inhibit signal prevents release of the parking brake by means of the parking brake controller 14 holding the parking brake 42 locked in the applied state.

After ensuring 111 that the hybrid vehicle is ready for a start of the internal combustion engine 18, the method continues with starting the internal combustion engine 18, which starting is performed by means of the engine control system 17.

The detecting 110 of a starting attempt, the ensuring 111 that the hybrid vehicle is ready for starting the internal combustion engine and the starting 121 of the internal combustion engine is performed by the electronic control system 10 of the hybrid vehicle 1. Preferably, the detecting 110 of the starting attempt and the starting 121 of the hybrid vehicle is performed by the engine control system 17, whereas the ensuring 111 that the vehicle is ready for an internal combustion engine start is performed by the engine control system 17 and the hybrid controller 13 in combination, wherein the hybrid controller may perform the steps of monitoring and determining 102 that the gear box 51 is in neutral, ensuring 103 that the gear box 51 is in neutral and monitoring and determining 104 that the parking brake 42 is applied, and informs the engine control system 17 that the hybrid vehicle is ready.

The ensuring 111 may include a step of determining whether charging of the hybrid vehicle 1 is in progress or not.

In accordance with a variant of the embodiment of FIG. 2, the hybrid vehicle 1 may already have determined, i.e. prior to detecting 110 a starting attempt, that the hybrid vehicle 1 is ready for a start of the internal combustion engine. When the charging process is initiated, the hybrid controller 13 may perform the steps of monitoring and determining 102 that the gear box 51 is in neutral, ensuring 103 that the gear box 51 is locked by locking the gear box 51 and monitoring and determining 104 that the parking brake 42 is applied before requesting charging from the external charging station 3. In such a case, the hybrid controller 13 may make an indication, in the electronic control system 10 of the hybrid vehicle 1, that an engine start is allowed. In this case, the electronic control system 10 of the hybrid vehicle 1 need only check if the indication that start of the internal combustion engine 18 is allowed in order to perform the step of ensuring 111 that the vehicle is ready for start of the internal combustion engine 18.

Figure 3:
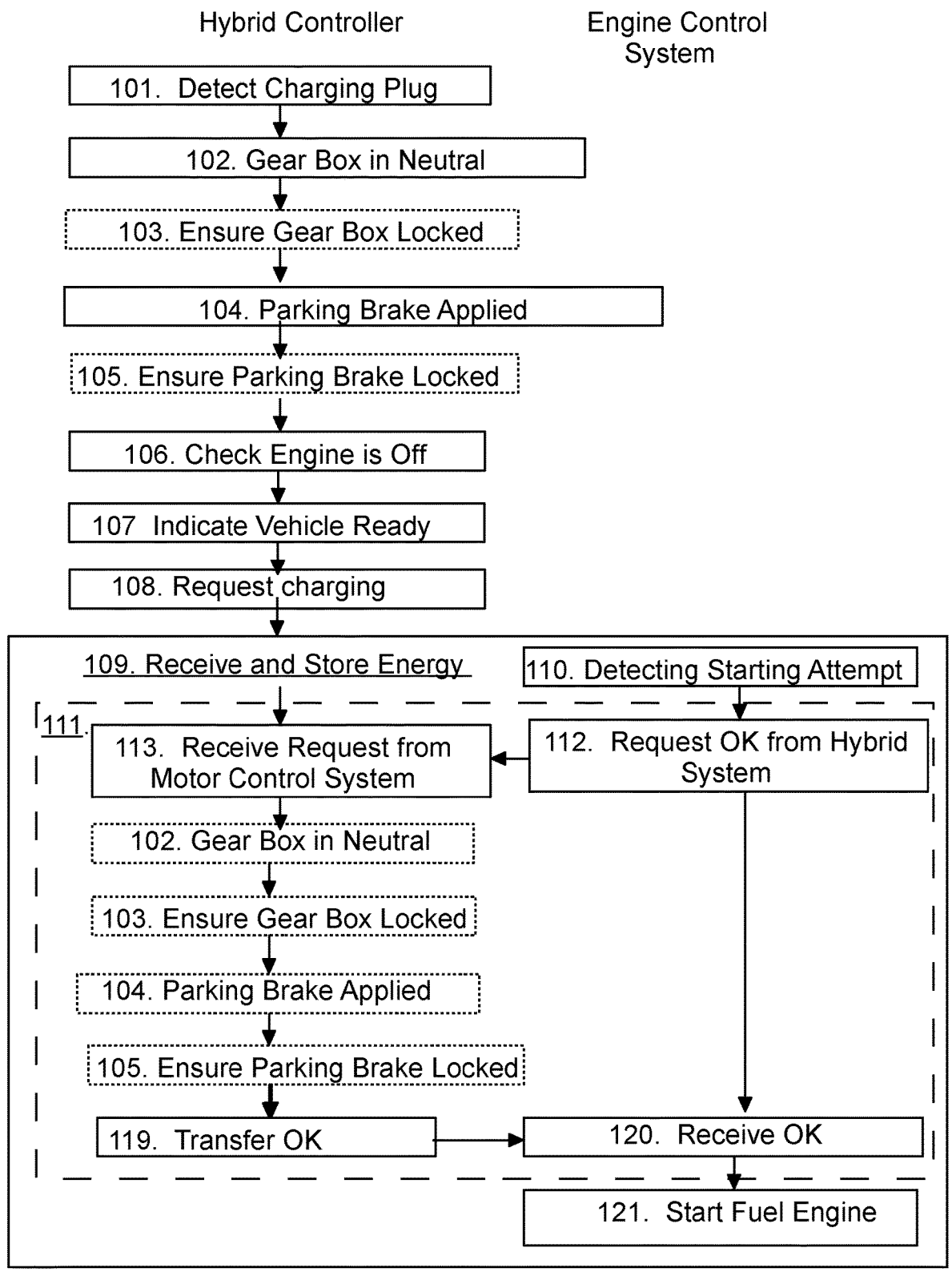
FIG. 3 is a schematic flow chart illustrating embodiments of a method of controlling charging of a hybrid vehicle.

FIG. 3 illustrates the start 101-108 of a charging process and the subsequent charging (109), during which charging (109) a starting attempt of the internal combustion engine 18 is performed.

FIG. 3 illustrates how the method may be performed by the hybrid controller 13 and the engine control system 17 in cooperation. FIG. 3 also illustrates how the hybrid controller 13 and the engine control system 17 interacts during the method of charging the hybrid vehicle 1, wherein a starting attempt (110) is performed by the driver during the actual charging 109 when electrical energy is received and stored (109).

In a representative scenario before the hybrid vehicle performs the charging control, a driver of the hybrid vehicle 1 parks the hybrid vehicle 1 at a charging station 3, sets the gear box 51 in neutral, turns off the engine 18, applies the parking brake 42, and inserts the plug 7 of the charging station 3 into a charging socket of the charging unit 31 of the hybrid vehicle 1.

In the embodiment illustrated in FIG. 3, the control of the charging process is performed by the hybrid controller 13 and the control of the internal combustion engine start is performed by the engine control system 17 in communication with the hybrid controller 13.

It is suitable to provide the charging control and starting control functions as computer software, which when run on a hybrid controller 13 and engine control system 17, respectively, or other computer control unit or units, such as ECUs, of a hybrid vehicle 1, makes the hybrid vehicle 1 perform the method.

The method for controlling charging starts with detecting 101 the presence of the charging plug 7 in the charging socket of the charging unit 31. The hybrid controller 13 is configured to register the presence of the charging plug 7 upon detection of the charging plug 7 during its insertion, and sets a connection state indicator in a memory of the electronic control system 10 of the hybrid vehicle 1 to indicate that a charging plug 7 has been connected.

The method may suitably continue with initiating communication with the charging station 3, wherein a handshaking process is performed between the hybrid vehicle 1 and the charging station 3. The initiation may include verification of the charging station 3 and of the hybrid vehicle 1, using e.g. exchange of password, electronic identification or encryption keys. The hybrid controller 13 is configured to register a successfully initiated communication and sets a communication state indicator to indicate that communication with a charging station 3 commence and is available.

The method further includes ensuring 102-106 that the hybrid vehicle 1 is ready to be charged. The ensuring 102-106 that the hybrid vehicle is ready for charging includes:
  ensuring 102, 103 that the gear box 51 is in the neutral gear;
  ensuring 104, 105 that the parking brake 42 is applied; and
  checking 106 that the engine 18 is off.

The ensuring 102, 103 that the gear box 51 is in the neutral gear comprises monitoring and determining that the gear box 51 is in the neutral and ensuring that the gear box 51 is locked by locking the gear box 51. The gear box 51 is locked electronically by means of an inhibit signal as previously described.

The ensuring 104, 105 that the parking brake is applied comprises monitoring and determining 104 that the parking brake is applied and may also include ensuring 105 that the parking brake 42 is locked by locking the parking brake 42. The parking brake 42 is locked electronically as previously described.

The monitoring of the parking brake 42, in step 104, may also include monitoring the pressure of the pneumatic driving system 41 of the parking brake 42 to ensure proper functioning of the parking brake 42.

The method may continue by indicating 107 that the hybrid vehicle 1 is ready for charging, which indication may be used during the subsequent charging (109) to ensure 111 that the hybrid vehicle 1 is ready for starting the internal combustion engine 18. The indication can be provided by registering that the internal combustion engine is not running and by means of the previously described inhibit signals that prevent maneuvering of the gear box 51 and maneuvering of the parking brake 42. The inhibit signals should be provided as long as the hybrid vehicle 1 remains connected to the charging cable 5 of the charging station 3, as detected in step 101.

After ensuring 102-106 that the hybrid vehicle 1 is ready for charging, the method continues with requesting 108 charging from the external charging station 3. The charging station 3 responds by starting to supply electrical energy to the hybrid vehicle 1.

The actual charging begins and the hybrid vehicle 1 receives and stores 109 electrical energy, which charging is controlled by the hybrid controller 14 and wherein the charging unit 31 receives the electrical energy and the drive assembly battery storage 32 stores the electrical energy.

During the receiving and storing 109 of electrical energy, the engine control system 17 detects 110 a starting attempt. The engine control system 17 and the hybrid controller cooperates in ensuring 111 that the hybrid vehicle 1 is ready for start of the internal combustion engine 18.

After detecting 110 the starting attempt, the engine control system continues with inquiring or requesting 112 the hybrid controller 13 if starting is allowed.

The hybrid controller 13 receives 113 the request for starting and as a response to the request continues with:
  ensuring 102, 103 that the gear box 51 is in neutral;
  ensuring 104, 105 that the parking brake is applied; and
  transferring 119 a message indicating that starting is allowed.

The engine control system 17 receives 120 the message and continues with starting 121 the internal combustion engine 18 as a response to the ensuring 111 that the hybrid vehicle 1 is ready for starting the internal combustion engine 18.

During the receiving and storing 109 of electrical energy, the ensuring 102, 103 that the gear box 51 is in neutral comprises:
  monitoring and determining 102 that the gear box 51 is in neutral; and
  ensuring 103 that the gear box 51 is locked, by monitoring and determining that the gear box 51 is locked.

Alternatively, the ensuring 102, 103 that the gear box 51 is in neutral comprises using the indication made in step 107, after ensuring 102-106 that the hybrid vehicle 1 is ready for charging, which indication ensure that the gear box 51 is locked in the neutral gear.

During the receiving and storing 109 of electrical energy, the ensuring 104, 105 that the parking brake 42 is applied comprises:
  monitoring and determining 104 that the parking brake 42 is applied; and
  ensuring 105 that the parking brake 42 is locked, by monitoring and determining that the parking brake 42 is locked.

Alternatively, the ensuring 104, 105 that the parking brake 42 is applied comprises using the indication made in step 107, after ensuring 102-106 that the hybrid vehicle 1 is ready for charging, which indication ensure that the parking brake 42 is applied, and preferably locked.

A hybrid vehicle 1 comprising an internal combustion engine 18, a hybrid system, a parking brake 42, a gear box 51 and an electronic control system 10 has been provided. A method for controlling a hybrid vehicle 1 has also been provided. The method comprises charging the hybrid vehicle 1 by receiving and storing 109 electric energy, and the electronic control system 10 is configured to perform the method, which enables a safe way of starting the internal combustion engine during the charging. Especially, the electronic control system 10 is configured to:

detect 110 a starting attempt of the internal combustion engine 18 during the receiving and storing 109 of electrical energy;

ensure 111 that the hybrid vehicle 1 is ready for a start of the internal combustion engine 18, which includes ensuring 102, 103 that the gear box 51 is in a neutral gear and ensuring 104, 105 that the parking brake 42 is applied; and start 121 the internal combustion engine 18 during the receiving and storing 109 of electrical energy and after ensuring 102, 103 that the gear box 51 is in the neutral gear, and after ensuring 104, 105 that the parking brake 42 is applied.

The invention claimed is:

1. A hybrid vehicle comprising an internal combustion engine, a hybrid system comprising a charging unit, a battery storage, at least one electric motor, a parking brake, a gear box and an electronic control system configured to control the internal combustion engine, the hybrid system, the parking brake and the gear box, and which hybrid vehicle is configured to receive and store electrical energy during a charging process wherein the charging unit receives electrical energy from an external charging station and the battery storage stores the electrical energy for subsequent use by the at least one electric motor, said charging process being controlled by the electronic control system, and wherein the electronic control system is configured to:

detect that the hybrid vehicle is receiving and storing electrical energy;

detect a starting attempt of the internal combustion engine while the hybrid vehicle is receiving and storing of electrical energy;

lock the gear box in neutral gear;

ensure that the parking brake is applied;

start the internal combustion engine while the hybrid vehicle is the receiving and storing of electrical energy and after ensuring that the parking brake is applied; and maintain the lock on the gear box in neutral gear while and the parking break is applied while the hybrid vehicle is receiving and storing of electrical energy.

2. The hybrid vehicle according to claim 1, wherein the electronic control system is configured to lock the gear box in the neutral gear before starting the process of receiving and storing electrical energy.

3. The hybrid vehicle according to claim 1, wherein the electronic control system is configured to lock the gear box electronically.

4. The hybrid vehicle according to claim 1, wherein the electronic control system is configured to lock the parking brake in its applied state in order to ensure that the parking brake is applied before the starting of the internal combustion engine.

5. The hybrid vehicle according to claim 4, wherein the electronic control system is configured to lock the parking brake electronically.

6. The hybrid vehicle according to claim 1, wherein the electronic control system is configured to check that the internal combustion engine is off before starting the process of receiving and storing electrical energy.

7. A method for controlling a hybrid vehicle, which hybrid vehicle comprises: an electronic control system; a hybrid system comprising a charging unit for receiving electric energy, an electric motor and a battery storage; an internal combustion engine; a gear box; and a parking brake, wherein the electronic control system is operatively connected to the internal combustion engine, the gear box, the hybrid system, and the parking brake, and is configured to perform:

detecting that the hybrid vehicle is receiving and storing electric energy, wherein the hybrid vehicle receives electric energy from an external charging station and stores the electric energy in the battery storage of the hybrid vehicle;

detecting a starting attempt of the internal combustion engine while the hybrid vehicle is receiving and storing of electric energy;

locking the gear box in neutral gear;

ensuring that the parking brake is applied;

starting the internal combustion engine while the hybrid vehicle is the receiving and storing of electric energy and after ensuring that start of the internal combustion engine is allowed; and maintaining the lock on the gear box in neutral gear while and the parking break is applied while the hybrid vehicle is receiving and storing of electrical energy.

8. The method for controlling a hybrid vehicle according to claim 7, wherein the locking of the gear box is performed electronically.

9. The method for controlling a hybrid vehicle according to claim 7, wherein the locking of the gear box in the neutral gear is performed prior to receiving and storing the electric energy.

10. The method for controlling a hybrid vehicle according to claim 7, further comprising checking that the engine is off before receiving and storing the electric energy.

11. The method for controlling a hybrid vehicle according to claim 7, wherein the ensuring that the parking brake is applied comprises locking the parking brake.

12. The method for controlling a hybrid vehicle according to claim 11, wherein the locking of the parking brake is performed electronically.

13. The method for controlling a hybrid vehicle according to claim 12, wherein the locking of the parking brake is performed electronically by setting an inhibit signal in the electronic control system.

14. A computer program product comprising computer program code stored in a non-transitory computer-readable medium readable by a computer, said computer program product used for controlling a hybrid vehicle, which hybrid vehicle comprises: an electronic control system; a hybrid system comprising a charging unit for receiving electric energy, an electric motor and a battery storage; an internal combustion engine; a gear box; and a parking brake, wherein the electronic control system is operatively connected to the internal combustion engine, the gear box, the hybrid system, and the parking brake, said computer program code comprising computer instructions to cause one or more computer processors to perform the following operations:

detecting that the hybrid vehicle is receiving and storing electric energy, wherein the hybrid vehicle receives electric energy from an external charging station and stores the electric energy in the battery storage of the hybrid vehicle;

detecting a starting attempt of the internal combustion engine while the hybrid vehicle is receiving and storing of electric energy;

locking the gear box in neutral gear;

ensuring that the parking brake is applied; and starting the internal combustion engine while the hybrid vehicle is the receiving and storing of electric energy; and maintaining the lock on the gear box in neutral gear while and the parking break is applied while the hybrid vehicle is receiving and storing of electrical energy.

\* \* \* \* \*